Feb. 13, 1968     K. W. MAYNARD     3,368,314
COATED HEAT RESISTANT HONEYCOMB STRUCTURE
AND PROCESS OF MAKING SAME
Filed April 26, 1965     3 Sheets-Sheet 1

FIG. II

INVENTOR.
K. W. MAYNARD
BY
*George E. Pearson*
ATTORNEY

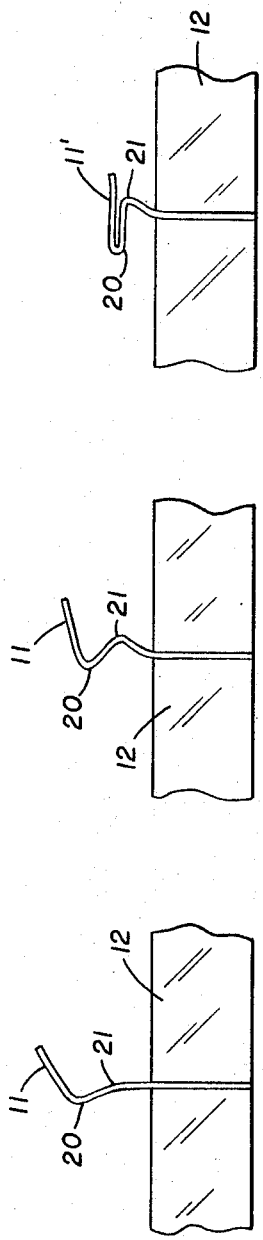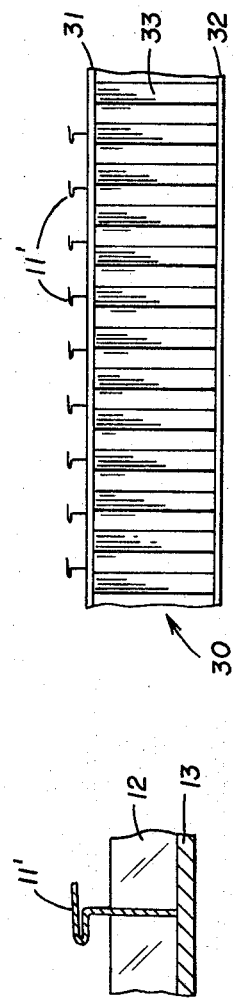

ꞏUnited States Patent Office 3,368,314
Patented Feb. 13, 1968

3,368,314
COATED HEAT RESISTANT HONEYCOMB STRUCTURE AND PROCESS OF MAKING SAME
Kermit W. Maynard, Bonita, Calif., assignor to Rohr Corporation, San Diego, Calif., a corporation of California
Filed Apr. 26, 1965, Ser. No. 450,906
4 Claims. (Cl. 52—451)

ABSTRACT OF THE DISCLOSURE

A heat shield is disclosed for protecting rocket motors from exhaust reflected heat waves. A brazed metallic honeycomb panel base structure has an open faced metallic honeycomb core brazed to one facing sheet of the panel. The cells on the open face of the honeycomb core have peripherally extending flanges accomplished by successively passing the honeycomb core prior to brazing and while wax supported to its ultimate height between spaced rollers which are moved successively closer together with each pass of the core therebetween. A slurry or paste of fibrous potassium titanate is trowelled into and over the flanged honeycomb core and is thus strengthened by the core and retained against the base structure by the flanges of the core.

State of the prior art

This invention relates to high strength heat resistant structures generally and more specifically to a coated heat resistant honeycomb structure and the process of flanging the core of the same to secure the coating thereto.

The flange method of physically attaching a thermal insulating coating to a honeycomb structure was heretofore not possible and prior art methods, on the other hand, are prohibitively expensive. One highly expensive prior art method, for example, requires the spot welding of wires across the face of the honeycomb structure to hold the coating to the cell walls. This prior art method, however, fails to adequately hold the coating on the honeycomb structure. Another prior art method which has not proved successful requires partial removal of material at the cell nodes of the honeycomb core and the bending over of the individual cell walls. Although this prior art method provided a flange for attaching the coating to the honeycomb structure, the flange was ineffective for the purpose since the strength and rigidity of the flanged honeycomb wall structure was lost due to the extreme thinness of the cell walls and the removal of material at the cell nodes.

In accordance with the present invention the cell walls are flanged by a pressure rolling action without removal of node section material and in such a manner as to permit adequate holding of various thermal insulating coating materials which are generally sprayed, trowelled, packed or vibrated into the cells of the honeycomb structure. Since no material is removed from the honeycomb structure, as in the prior art methods, the honeycomb structure retains its desirable strength and rigidity.

By bending over the cell walls in a manner not requiring removal of material at the node sections, flanges are produced which protrude on both sides of the vertical cell wall similar to a T configuration. By producing such a flange configuration this invention provides a holding edge on all four sides of the cell while maintaining the necessary strength and rigidity of the honeycomb structure.

Summary of the invention

In summary, the present invention provides a composite structure for protection against heat and shock resulting, for example, from exhaust reflected heat waves to which rocket motors may be subjected. The composite structure comprises a brazed metallic sandwich panel section having facing sheets brazed to the opposite faces of an internal honeycomb core and an external open ended honeycomb core brazed to the external face of one of the facing sheets. The cell walls at the open end of the external core are flanged to retain a thermal insulating material in the form of a hardenable slurry within the cells and over the open face of the core. Flanging of the cell walls is accomplished prior to brazing by filling the cells to a predetermined height with a removable filler material and repassing the filled core between spaced rollers to form the unsupported core walls into a substantially T-shaped flange configuration upon successive reductions in the spacing between the rollers.

Objects

An object of the present invention is to provide a new and improved fabrication method for attaching a thermal insulating coating to a base structure.

Another object is to fabricate a high strength light weight and heat resistant coated structure capable of withstanding high loads and high temperature conditions.

Another object is to eliminate such costly operations as removing material at the node sections of the honeycomb structure and spot welding wires across the face of the honeycomb structure as required by prior art methods.

Still another object is to provide a holding edge on all four sides of a honeycomb cell structure while still maintaining the strength and rigidity of the honeycomb structure.

Still other objects, features and advantages of the present invention will become more clearly apparent as the description proceeds, reference being had to the accompanying drawings wherein:

Brief description of the figures

FIG. 6 is a fragmentary sectional view taken along the line 6—6 of FIG. 5 and approximately double size, showing the flange configuration of a cell wall, still embedded in its wax base, after the flange forming operation has been completed;

FIGS. 7, 8, and 9 are schematic views depicting various stages of the flange forming operation of the cell wall;

FIG. 10 is a view in elevation of a honeycomb panel base structure having the flanged cell structure attached thereto, the flanged structure appearing as in FIG. 6;

FIG. 11 is an elevational view of the coated composite structure of the present invention.

Specification

Figure 2:
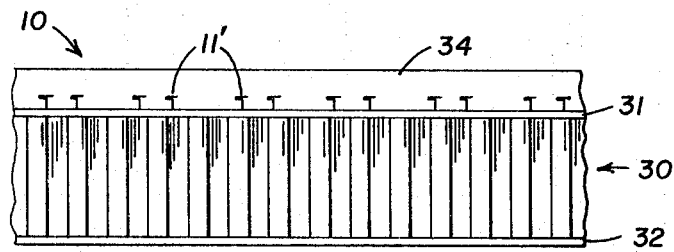
FIG. 2 is a perspective view of the honeycomb structure prior to the flanging of the cell walls.
Figure 2:
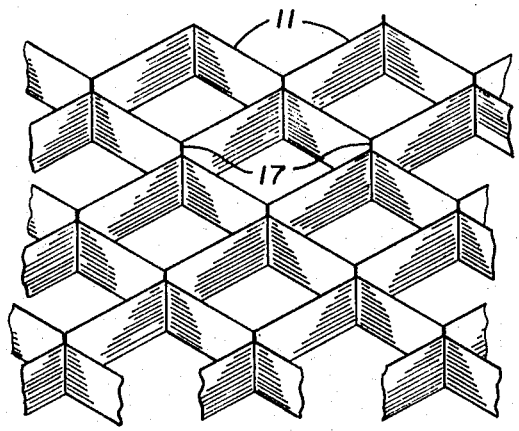

Describing the invention in detail, attention is directed to FIG. 2 which shows a honeycomb cell structure 11 which is used for holding a thermal insulating coating. This cell structure 11 is not only used to hold said coating but provides a rigid high strength structure capable of withstanding high loading conditions.

Figure 3:
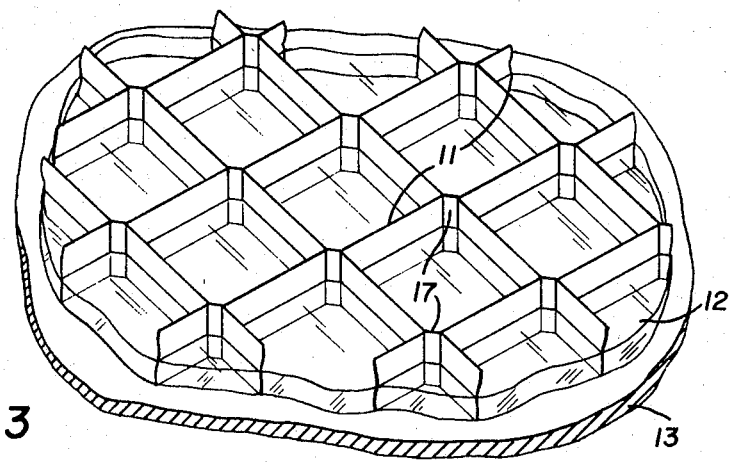
FIG. 3 is a perspective view of the honeycomb structure secured in wax prior to the flanging operation.

In order to support the cell structure 11 and prevent it from collapsing while the flange configuration is being formed, the cell structure 11 is embedded in wax 12 and secured to the platen 13 as shown in FIG. 3. Sufficient cell wall structure 11 necessary to form the desired flange configuration is permitted to extend above the holding wax 12.

Figure 4:
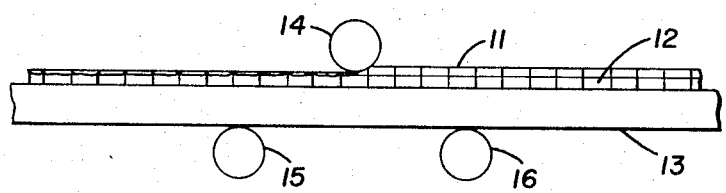
FIG. 4 is a schematic view in elevation of the honeycomb structure passing through a series of rollers which form the flanges of the cell walls.

FIG. 4 shows the cell structure 11 embedded in the wax 12 and on the platen 13 passing through a series of rollers 14, 15 and 16 which bend over the cell wall structure 11 and form the flange configuration. A total of two or three passes through the rollers 14, 15 and 16 is usually required to achieve the desired flange configuration. A rolling mill such as a "Farnham" where the height of the roller 14 above the wax 12 can be adjusted after each pass preferably is used to achieve the desired flange configuration, designated 11' in FIGS. 5, 6 and 9 to 11.

Figure 5:
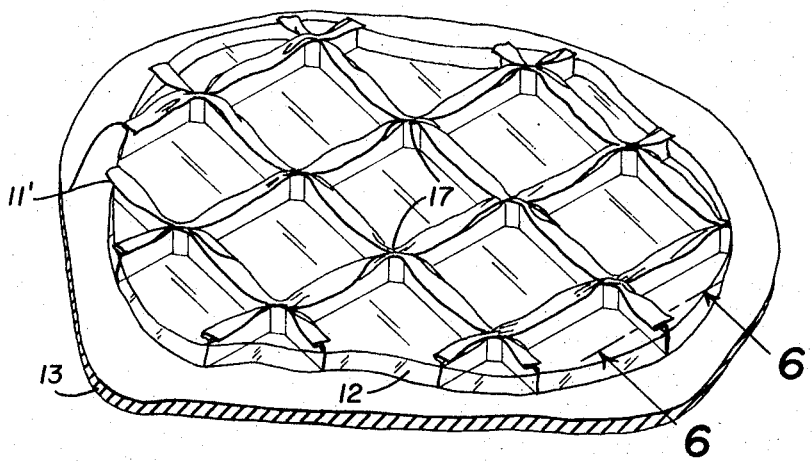
FIG. 5 is a perspective view of the honeycomb structure still embedded in its wax base after the flange forming operation has been completed.

FIG. 5 shows the cell structure 11 embedded in the wax 12 after the necessary number of passes of the flange forming operation have been completed. It should be noted while the cell structure 11 forms a flange configuration 11' between the node sections 17, the node section 17 does not bend over but remains intact and is only crushed by the rolling action. By not separating at the node sections 17, the cell structure 11 retains its inherent rigidity and strength characteristics. It has been found that regardless of the direction in which the cell structure 11 is fed into the rollers 14, 15 and 16, the node sections 17 always remain together and a flange configuration 11' is formed therebetween as shown in FIG. 6.

The exact way in which this particular flange configuration 11' is consistently produced throughout the cell structure 11 is unknown. Although not wishing to be bound by such theory, it is believed that the flange configuration 11' is the result of a series of particular deformations of the cell wall structure 11 which is partially restrained by the node sections 17 of the honeycomb structure. Referring to FIG. 7, it will be noted that after the first pass through the rollers 14, 15 and 16, the cell wall structure 11 is bent over at point 20 but is prevented from bending over completely at point 21 due to the restraint imposed by the fixed node sections 17.

In FIG. 8 the deformation of the cell wall structure 11 is shown after a second pass is made with roller 14 adjusted a little closer to the top of the wax 12. The cell structure wall 11 is bent over at point 20 but is still restrained at point 21 by the rigidity imposed by the node sections 17. At this stage of the deformation the portion of the cell wall structure 11 above point 20 has been bent over about as far as possible by the action of the rollers 14, 15 and 16 and the force imparted to the cell wall structure 11 will now tend to buckle or collapse the portion of the cell structure wall 11 below point 20.

In FIG. 9 the final deformation of the cell wall structure 11 is shown after the roller 14 is adjusted even closer to the top of the wax 12. After this final pass by the rollers 14, 15 and 16, the portion of the cell wall structure 11 below point 20 is completely collapsed but not beyond point 21 which is still being restrained by the rigidity of the node sections 17 of the honeycomb structure.

After the desired flange configuration 11' is obtained, the wax 12 is removed from the cell structure 11.

FIG. 10 shows the way in which the flanged cell structure 11' is brazed to a base composite structure 30 consisting of face sheets 31 and 32 and a core section 33. The brazing of the flanged cell structure 11' to the face sheet 31 is performed simultaneously with the brazing of the face sheet 31 to the core section 33 and the brazing of the core section 33 to the face sheet 32. The brazing operations can also be performed as separate operations. This brazing operation is performed by any suitable process and preferably by the brazing process as claimed in Thomas A. Herbert, Jr. Patents No. 3,033,973 for Apparatus and Method for Brazing Honeycomb Sandwich Panels, and No. 2,984,732 for Apparatus and Method for Brazing Honeycomb Sandwich Panels. The flanged cell structure can also be attached to the base structure by bonding, welding or by mechanical attachment.

After the attachment of the flanged cell structure 11' to the base composite structure 30 is completed, a coating material 34 as shown in FIG. 11, such as fibrous potassium titanate in the form of a slurry or paste, is trowelled into and over the flanged cell structure 11'. Once the desired thickness of the coating 34 is obtained, the coating 34 is heated to 180° F. to drive out any excessive moisture.

Figure 1:
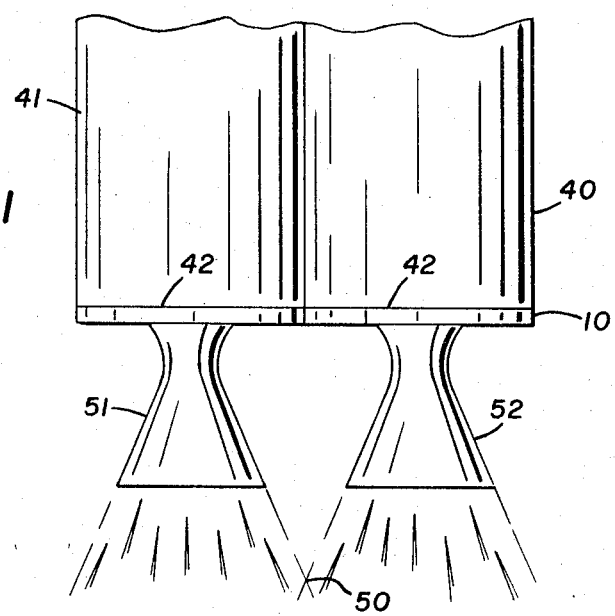
FIG. 1 is a fragmentary elevational view showing a typical application of this invention as a heat shield for both liquid and solid rockets.

Referring to FIG. 1, the advantages of this invention can be seen in its use as a heat shield 10 for both liquid and solid rockets. In missiles and space vehicles employing a plurality of rocket motors 40 and 41, there are areas where the exhaust from the rocket nozzle 51 and 52 intersect and interfere with each other such as at point 50. At this point 50 there is a resulting turbulence which directs heat waves upward to impinge upon the surfaces 42 of the rockets 40 and 41. By using the composite structure 10 of this invention as a heat shield on the under surfaces 42, the inner workings of the rockets 40 and 41 are protected from the thermal and shock effects of the turbulently created heat waves.

From the foregoing it will now be apparent that a novel and unique coated heat resistant honeycomb structure and a process of manufacture thereof are well adapted to fulfill the aforestated objects of the invention. While various alternative embodiments and methods which fall within the scope of the present invention may suggest themselves to those skilled in the art, it is intended in the appended claims to cover all such additional embodiments, constructions and methods which fall within the spirit and scope of the invention.

Having thus described the invention, what is claimed as new and useful and what is desired to be secured by Letters Patent is:

1. A composite structure for protection against heat and shock comprising a metallic honeycomb core structure having peripherally flanged cell walls on one face thereof, a brazed metallic sandwich panel section having a honeycombed core and facing sheets, and a thermal insulating material covering a facing sheet of said panel section and formed of a hardenable slurry, said panel section facing sheet having the opposite face of said honeycomb core structure brazed thereto, said honeycomb core structure being embedded in said thermal insulating material.

2. A process of peripherally flanging the cell walls of each cell of a metallic honeycomb core structure comprising the steps of physically supporting said core structure by filling the cells thereof with a removable filler material to a predetermined height to allow for flanging of the non-supported portion of said cell walls, and passing said core structure between rollers spaced apart in an amount corresponding to said predetermined height to effect said peripheral flanging of said unsupported portion of said cell walls.

3. A process for peripherally flanging the cell walls of a honeycomb core structure comprising the steps of supporting said core structure by filling in the cells thereof with a removable filler material to a predetermined height, passing said supported core structure through confronting pressure rolls to form a substantially T-shaped flange configuration in the unsupported portion of said core structure walls.

4. A process as in claim 3 and comprising the additional steps of successively decreasing the spacing between said confronting rollers and repassing said supported structure therebetween.

References Cited

UNITED STATES PATENTS

| | | | |
|---|---|---|---|
| 2,086,525 | 7/1937 | Akers | 52—599 |
| 2,982,623 | 5/1961 | Johnson | 52—443 X |
| 3,025,935 | 3/1962 | Ensrud et al. | 52—613 |
| 3,064,317 | 11/1962 | Dobson | 52—615 X |
| 3,196,533 | 7/1965 | Ida et al. | 29—455 |
| 2,654,686 | 10/1953 | Hansen | 29—455 |
| 2,728,479 | 12/1955 | Wheeler | 29—455 |
| 2,851,133 | 9/1958 | Steele | 29—455 |
| 3,210,233 | 10/1965 | Kummer | 161—68 |

HENRY C. SUTHERLAND, *Primary Examiner.*

FRANK L. ABBOTT, *Examiner.*

G. W. HORNADAY, *Assistant Examiner.*